March 10, 1964 R. D. BREMER 3,123,898
METHOD OF MAKING A TUBULAR ELECTRIC HEATING ELEMENT
Filed May 21, 1959
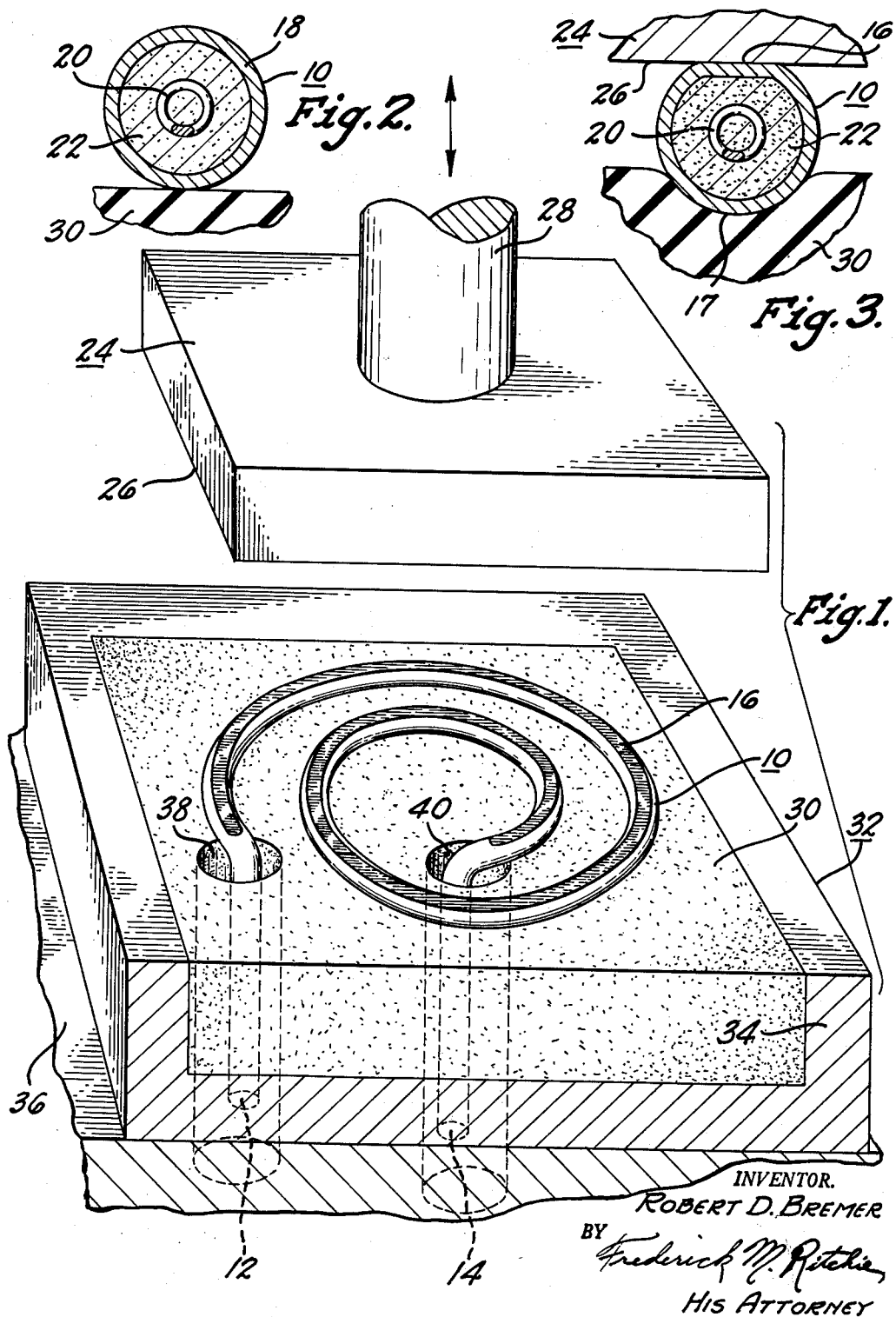
INVENTOR.
ROBERT D. BREMER
BY Frederick M. Ritchie
HIS ATTORNEY

United States Patent Office 3,123,898
Patented Mar. 10, 1964

3,123,898
METHOD OF MAKING A TUBULAR ELECTRIC HEATING ELEMENT
Robert D. Bremer, Dayton, Ohio, assignor to General Motors Corporation, Detroit, Mich., a corporation of Delaware
Filed May 21, 1959, Ser. No. 814,899
2 Claims. (Cl. 29—155.63)

This invention relates to a domestic appliance and more particularly to a method of making a spirally formed tubular heating element.

In the electric range art it has become conventional practice to use a spirally wound heating element as the surface cooking unit for a range. To secure the optimum heat transfer from such cooking units to any utensil placed thereon, it has also been found effective to flatten the surface of the heating element adjacent the utensil. In the prior art, the method for flattening the top surface of a spiral or wound heating element has been accomplished with steel dies. In this practice, however, each differently sized heating element requires a complementary grooved die to support the convolutions of the element while the top surface thereof is being compressed or flattened. Where the configuration of the tubular element does not match exactly the groove in the die, the tube frequently will be pinched during the press flattening operation. These foregoing disadvantages serve to increase the cost of producing tubular heating elements and to slow the rate at which such elements can be turned out.

Accordingly, it is an object of this invention to provide a method for forming irregularly shaped tubular elements without utilizing grooved dies.

It is also an object of this invention to utilize a press forming operation whereby a single punch and die assembly may form differently sized tubular elements.

A further object of this invention is the provision of a press operation wherein the press members are self-aligning with the work piece.

A still further object of this invention is a forming operation for a tubular heating element wherein the dielectric powder may be uniformly compacted.

A more specific object of this invention is the provision of an apparatus for forming a flattened surface on a tubular heating element by providing a resilient support for said element and a punch for flattening said surface.

Still another advantage may be obtained from this invention by the provision whereby an irregularly shaped work piece may be placed in any position on a bottom die member prior to being worked upon by a top punch member.

Further objects and advantages of the present invention will be apparent from the following description, reference being had to the accompanying drawings wherein preferred embodiments of the present invention are clearly shown.

In the drawings:

FIGURE 1 is a rather diagrammatic perspective view, partly in section, of press forming apparatus after it has been utilized to form a heating element;

FIGURE 2 is a cross-sectional view of a tubular heating element suitable for use with this invention prior to the forming operation; and FIGURE 3 is a cross-sectional view of the tubular heating element during the forming operation.

In accordance with this invention and with reference to FIGURE 1, a tubular heating element 10 is shown which may be of the type generally used for converting electrical energy to heat in an electric range. The heating element 10 is formed with terminal end portions 12 and 14 to which a conventional switch may be joined for varying the heat output of the heating element 10. It has been found that the heat transfer characteristics of the heating element 10 are best achieved when the upper surface thereof is formed with a flattened area 16. In addition to the improved heat transfer characteristics of such a flattened element, the flattening operation serves to compact a finely divided insulating substance 22 such as magnesium oxide within the element 10.

The cross-sectional view of the heating element 10 before the flattening operation of this invention is best seen in FIGURE 2. In this view the heating element 10 is shown comprised of an outer metallic sheath or container 18, a spirally wound resistance wire 20 and a dielectric filler 22, such as magnesium oxide. The spirally wound heating element 10 assumes the cross-sectional configuration of FIGURE 2 prior to the utilization of the forming operation of this invention. The apparatus for this novel forming operation will now be clearly set forth.

The press of this invention is best shown in FIGURE 1 and is comprised of a punch member 24 having a substantially flat bottom surface 26 and an actuating rod 28. Conventional means may be provided to reciprocate vertically the punch 24 each time that a heating element 10 is to be flattened by the forming operation of this invention. A bottom die 30 is formed of resilient yieldable or deformable material, such as rubber having approximately a 70–80 Shore hardness. However, the particular hardness or rate of elasticity chosen for the resilient member 30 may be varied in accordance with the characteristics of the tubular element being formed, i.e. the easier the tubular element is to deform, the less the resistance necessary in the resilient die 30.

During the press forming operation, it is desirable to retain the resilient member 30 within set limits. For this purpose, a bottom die support 32 is used in which a peripherally arranged upstanding wall 34 restricts the outward movement of the resilient die 30. Note that the wall 34 completely circumscribes the die 30, the front portion thereof being cut away to show the die. The die support 32 may be carried on any conventional support or table 36. During the die forming operation, an accommodation must be made for the terminal ends 12 and 14 to extend through the resilient die member 30. For this purpose, apertures 38 and 40 are drilled or formed in the resilient die 30, the die support 32 and, if need be, the die support table 36. The apertures 38 and 40 extend generally perpendicular to the surface of the die 30. Of course, the number of apertures 38 or 40 and the dimensions therefor will depend on the size and relationship of the end portions or terminal extensions 12, 14 of the tubular elements to be flattened.

To practice the concepts of this invention, a tubular element having the cross-section shown generally in FIGURE 2 may be assembled by a method such as that taught in copending application Serial Number 696,414 filed November 14, 1957. This method may be used to form a tubular sheath 18 having suspended therein a heating element 20 with a compacted insulating material 22, such as magnesium oxide. The sheath 18 is generally filled while in a substantially straight, tube-like configuration. After the filling and initial compacting of the dielectric insulating material 22 and after closing the terminal ends 12 and 14 to prevent loss of the material 22 from within the sheath 18, the substantially straight tubular sheath is wound into a generally open spiral configuration wherein the convolutions are co-planar to form the heating element 10. In preforming the element 10 before the surface is flattened, the terminal portions 12 and 14 are bent at substantially right angles to the plane of the spiral convolutions. In this way, the element 10 is prepared for the combination top surface flattening and dielectric material compacting operation conducted in accordance with this invention. With the punch member 24 in a raised position, as seen in FIGURE 1, the cylindrical or unflattened heating element 10 is placed on the resilient die 30 with the terminal portions 12 and 14 extending respectively through die apertures 38 and 40. Reference may be had to FIGURE 2 for the cross-section of the heating element 10 prior to the flattening and compacting operation. It will be noticed that the resilient die 30 is in its normal, non-compressed shape, merely supporting the convolutions of the tubular sheath 18 in any position on the die 30 within the limits imposed by the insertion of the terminal portions 12 and 14 in the die apertures 38 and 40.

The flattening and compacting operation begins with the energization of any conventional actuating mechanism which moves the punch member 24 downwardly. As the flat surface 26 of the punch contacts the top of the cylindrical tube or sheath 18, the entire heating element 10 is pressed into the resilient die 30. In accordance with the Shore hardness of the die 30, the resistance to penetration by the heating element 10 will increase until the continued downward movement of the punch 24 will start flattening the top of the tubular sheath 18 to form the flat surface 16. At the same time that the sheath 18 is being flattened, the dielectric material or magnesium oxide 22 is compacted about the resistance wire 20 to securely retain the wire in correct relationship to the sheath and to effect a compaction which will provide the optimum heat transfer from the resistance wire 20 to and through the sheath 18.

One of the advantages of this invention arises from the fact that the compaction of the insulating material 22 is more uniform. For instance, if the initial compaction of the material 22 has left certain areas within the sheath with a lesser density of magnesium oxide than others, the compaction will be equalized by the equal or uniform pressure of the resilient die 30 against the bottom 17 of the sheath 18. In other words, the bottom 17 of the sheath 18 will be forced inwardly in accordance with the relative density of the insulating material at any given point in the element 10. It will be noted that even though the bottom area 17 of the heating element 10, enveloped by the die 30, may be slightly irregularly or non-uniformly formed to effect uniform compaction, the top surface 16 will be uniform and co-planar.

It should now be seen that improved evenly compacted tubular heating elements of different sizes may be formed in a single apparatus. Further the apparatus of this invention may replace expensive grooved dies with inexpensive replaceable resilient or rubber dies. No particular positioning of the heating element is required on the resilient die and thus the production speed by which such elements are made may be increased.

While the embodiments of the present invention as herein disclosed, constitute preferred forms, it is to be understood that other forms might be adopted.

What is claimed is as follows:

1. A method of forming a spiral tubular type heating element having an outer sheath, an inner resistance wire and a compactible powdered insulating substance surrounding said resistance element comprising the steps of, suspending said resistance element in said sheath, filling said sheath with said insulating substance, closing the ends of said sheath, forming said sheath into said spiral heating element, placing said spiral heating element between a resilient die member and a flat non-resilient die member with the bottom of said heating element in juxtaposition to said resilient die member, and uniformly deforming the top of said heating element with said non-resilient die member while non-uniformly deforming the bottom of said heating element with said resilient die member by moving at least one of said die members toward the other of said die members to flatten the top of said heating element and to effect uniform compaction of the insulating substance.

2. A method of forming a tubular heating element comprising the steps of, filling a tube with compactible, powdered insulating material, closing the ends of said tube, forming said tube into a heating element having a substantially coplanar configuration, placing one side of said heating element in juxtaposition to a flat non-resilient die member and the other side of said heating element in juxtaposition to a resilient die member, and uniformly deforming said one side of said heating element with said non-resilient die member while non-uniformly deforming said other side of said heating element with said resilient die member to flatten said one side of said heating element and to effect uniform compaction of the insulating material.

References Cited in the file of this patent

UNITED STATES PATENTS

| | | |
|---|---|---|
| 1,267,591 | Rehbein | May 28, 1918 |
| 2,428,900 | Wiegand | Oct. 14, 1947 |
| 2,483,839 | Oakley et al. | Oct. 4, 1949 |
| 2,670,529 | Thomas | Mar. 2, 1954 |
| 2,683,839 | Beck | July 13, 1954 |
| 2,703,998 | Sowter | Mar. 15, 1955 |
| 2,735,390 | Engel | Feb. 21, 1956 |
| 2,785,270 | Burger | Mar. 12, 1957 |
| 2,901,023 | Teitleman | Aug. 25, 1959 |
| 2,942,222 | Nelson | June 21, 1960 |